(12) United States Patent
Lee

(10) Patent No.: US 6,575,281 B2
(45) Date of Patent: Jun. 10, 2003

(54) COUPLING DEVICE

(75) Inventor: Hyeongcheol Lee, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/908,196

(22) Filed: Jul. 18, 2001

(65) Prior Publication Data

US 2003/0017904 A1 Jan. 23, 2003

(51) Int. Cl.$^7$ ............................................... F16D 31/00
(52) U.S. Cl. ..................................... 192/49; 192/58.91
(58) Field of Search ............................. 192/49, 58.91; 74/650; 180/248

(56) References Cited

U.S. PATENT DOCUMENTS

| | | | |
|---|---|---|---|
| 473,444 A | * | 4/1892 | Barney ..................... 192/58.91 |
| 1,677,996 A | * | 7/1928 | Wingquist ................ 192/58.91 |
| 2,175,520 A | | 10/1939 | Frederickson |
| 2,623,619 A | | 12/1952 | Clerk |
| 2,986,024 A | * | 5/1961 | Power .......................... 464/25 |
| 3,118,292 A | | 1/1964 | Schroter et al. |
| 3,350,961 A | | 11/1967 | Dodge |
| 3,724,289 A | | 4/1973 | Kennicutt |
| 3,831,461 A | | 8/1974 | Mueller |
| 4,012,968 A | | 3/1977 | Kelbel |
| 4,462,272 A | | 7/1984 | Roper |
| 4,493,227 A | | 1/1985 | Schmid |
| 4,633,735 A | | 1/1987 | Sakurai et al. |
| 4,719,817 A | | 1/1988 | Azuma |
| 4,730,514 A | | 3/1988 | Shikata et al. |
| 4,779,698 A | | 10/1988 | Iwata |
| 4,838,118 A | | 6/1989 | Binkley |
| 4,841,809 A | | 6/1989 | Jolly |
| 4,867,012 A | | 9/1989 | McGarraugh |
| 4,884,653 A | | 12/1989 | Kouno |
| 4,905,808 A | | 3/1990 | Tomita et al. |
| 4,949,594 A | | 8/1990 | Galhotra |
| 4,960,011 A | | 10/1990 | Asano |
| 4,966,268 A | | 10/1990 | Asano et al. |
| 4,974,471 A | | 12/1990 | McGarraugh |
| 4,987,967 A | | 1/1991 | Kouno |
| 4,995,491 A | * | 2/1991 | Hiramatsu et al. ........ 192/58.91 |
| 5,007,886 A | | 4/1991 | Holmquist et al. |
| RE33,742 E | | 11/1991 | Blessing et al. |
| 5,092,825 A | | 3/1992 | Goscenski, Jr. et al. |
| 5,172,787 A | | 12/1992 | Kobayashi |
| RE34,209 E | | 3/1993 | McGarraugh |
| 5,194,053 A | | 3/1993 | Sano et al. |
| 5,201,820 A | | 4/1993 | Hamada et al. |
| 5,415,598 A | | 5/1995 | Sawase et al. |
| 5,445,574 A | | 8/1995 | Sekiquchi et al. |
| 5,456,641 A | | 10/1995 | Sawase |
| 5,469,950 A | | 11/1995 | Lundström et al. |

(List continued on next page.)

FOREIGN PATENT DOCUMENTS

| | | |
|---|---|---|
| GB | 2 187 824 A | 3/1986 |
| GB | 2252801 | 2/1992 |
| JP | 401182127 A | 7/1989 |
| JP | 1261553 | 10/1989 |
| JP | 2001-163079 A * | 6/2001 |

OTHER PUBLICATIONS

M. Okcuoglu, "A Descriptive Analysis of Gerodisc Type Limited Slip Differentials and All Wheel Drive Couplings", Society of Automotive Engineers, Inc., Copyright 1995, pp. 15–20.

Primary Examiner—Richard M. Lorence
(74) Attorney, Agent, or Firm—Brinks Hofer Gilson & Lione

(57) ABSTRACT

A device for coupling an input shaft and an output shaft is provided. The device includes a carrier coupled to the input shaft, a pressure chamber, and a rotary pump coupled to the carrier in the output shaft. The rotary pump is adapted to increase pressure in the pressure chamber upon relative rotational movement of the carrier and the output shaft and to resist relative rotational movement of the carrier in the output shaft upon the presence of sufficient pressure in the pressure chamber.

15 Claims, 2 Drawing Sheets

U.S. PATENT DOCUMENTS

| | | |
|---|---|---|
| 5,536,215 A | 7/1996 | Shaffer et al. |
| 5,542,316 A | 8/1996 | Spooner et al. |
| 5,690,002 A | 11/1997 | Showalter |
| 5,735,764 A | 4/1998 | Shaffer et al. |
| 5,827,145 A | 10/1998 | Okcuoglu |
| 5,888,163 A | 3/1999 | Shaffer et al. |
| 5,893,812 A | 4/1999 | Narai et al. |
| 5,915,513 A | 6/1999 | Isley, Jr. et al. |
| 5,916,052 A | 6/1999 | Dick |
| 5,938,555 A | 8/1999 | Leeper |
| 5,938,556 A | 8/1999 | Lowell |
| 5,941,788 A | 8/1999 | Shaffer et al. |
| 5,964,126 A | 10/1999 | Okcuoqlu |
| 5,979,631 A | 11/1999 | Lundstrom |
| 5,984,822 A | 11/1999 | Schreier et al. |
| 6,001,040 A | 12/1999 | Engle |
| 6,019,694 A | 2/2000 | Forrest et al. |
| 6,048,286 A | 4/2000 | Perry |
| 6,095,939 A | 8/2000 | Burns et al. |
| 6,119,061 A | 9/2000 | Schenkel et al. |
| 6,176,800 B1 | 1/2001 | Shaffer et al. |
| 6,213,241 B1 * | 4/2001 | Kita et al. .......... 180/248 |
| 6,332,522 B1 | 12/2001 | Morse et al. |

* cited by examiner

COUPLING DEVICE

TECHNICAL FIELD OF THE INVENTION

This invention relates generally to devices for coupling an input shaft and output shaft.

BACKGROUND OF THE INVENTION

Front wheel-drive-based vehicles with four-wheel-drive capabilities typically use a twin coupling device to couple a rear drive shaft, which travels from the engine to the rear of the vehicle, to a right half shaft and a left half shaft, which travel to the rear wheels. The twin coupling device typically provides front to rear wheel torque distribution, as well as left to right rear wheel torque distribution. Because of the advantages of four-wheel-drive, however, there is a need in the automotive industry for continuous improvement of the twin coupling device.

DETAILED DESCRIPTION OF THE INVENTION

The following description of the preferred embodiment of the invention is not intended to limit the scope of the invention to this preferred embodiment, but rather to enable any person skilled in the arts of coupling devices to make and use the invention.

Figure 1:
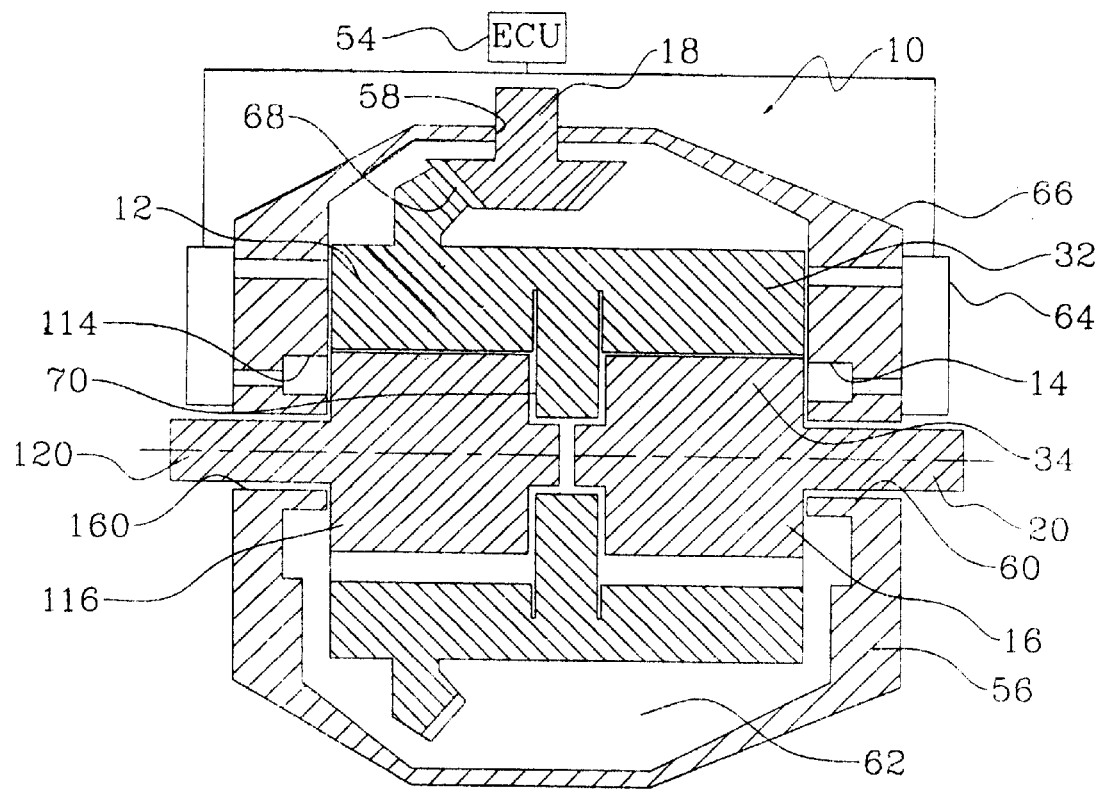
FIG. 1 is a cross-sectional view of the device of the preferred embodiment.

As shown in FIG. 1, the coupling device 10 of the preferred embodiment includes a carrier 12, a pressure chamber 14, and a rotary pump 16. The carrier 12 is preferably coupled to an input shaft 18, and the rotary pump 16 is preferably coupled to the carrier 12 and an output shaft 20. The rotary pump 16 preferably functions to increase pressure in the pressure chamber 14 upon relative rotational movement of the carrier 12 and the output shaft 20, and to resist relative rotational movement of the carrier 12 and the output shaft 20 upon the presence of sufficient pressure in the pressure chamber 12.

Figure 2:
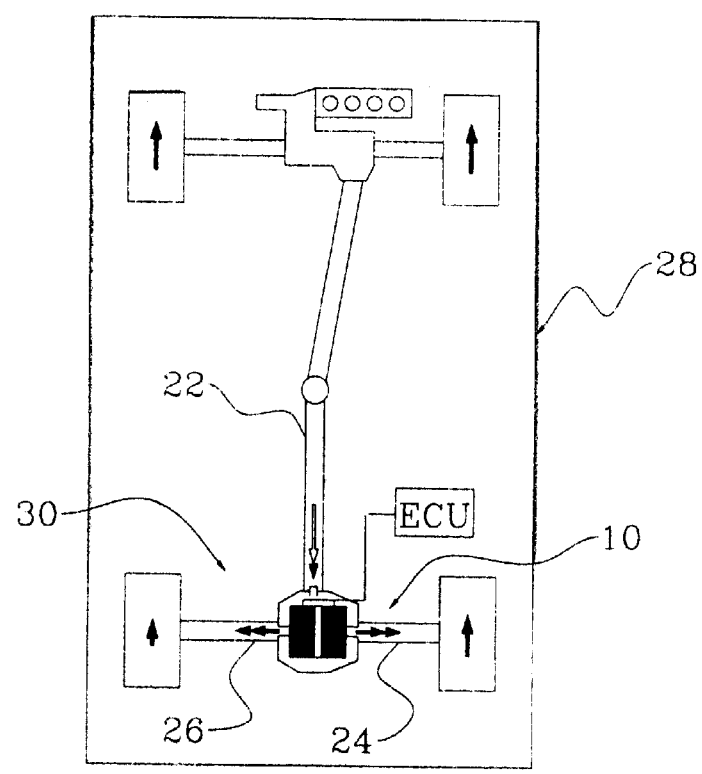
FIG. 2 is a schematic of the device in FIG. 1 arranged within a front-wheel-drive based vehicle with four-wheel-drive capabilities.

As shown in FIG. 2, the coupling device 10 of the preferred embodiment has been specifically designed for coupling a drive shaft 22, a right half shaft 24, and a left half shaft 26 of a front-wheel-drive based vehicle 28 with four-wheel-drive capabilities. In this arrangement, the coupling device 10 of the preferred embodiment is known as a twin coupling device 30. The coupling device 10, however, may be used in other suitable arrangements. As an example, the device may be used for coupling a front drive shaft and a rear drive shaft of a front-wheel-drive based vehicle with four-wheel-drive capabilities (known as a coupling device) or the device may be used for coupling a transmission output and a rear drive shaft in a rear-wheel-drive based vehicle with four-wheel-drive capabilities (known as a transfer case).

Figures 3A, 3B, 3C:
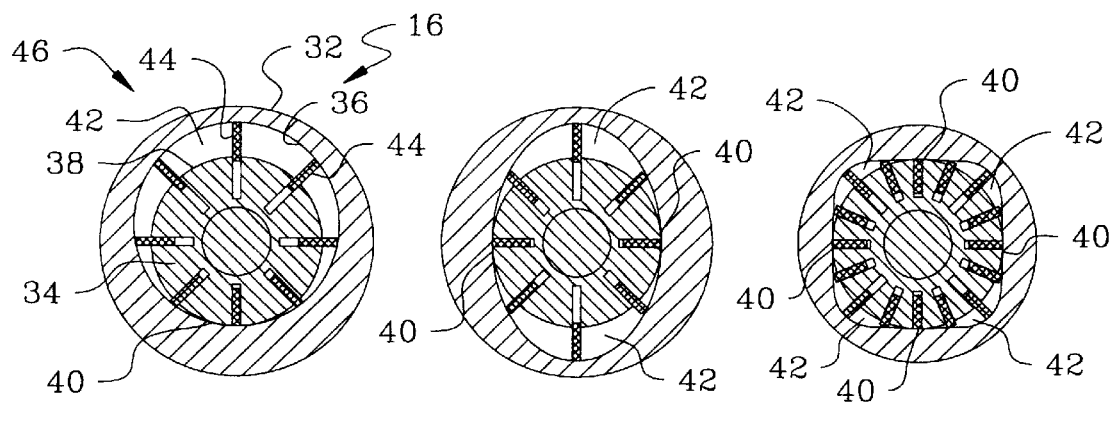
FIG. 3A is a cross-sectional view of the rotary pump of the device in FIG. 1.
FIGS. 3B and 3C are cross-sectional views of alternative rotary pumps of the device in FIG. 1.

As shown in FIG. 1, the rotary pump 16 preferably includes an exterior element 32 coupled to the carrier 12 and an interior element 34 coupled to the output shaft 20. As shown in FIG. 3A, the inner surface 36 of the exterior element 32 is preferably non-circular, while the outer surface 38 of the interior element 34 is preferably circular. In this manner, the distance from the interior element 34 to the external element 32 preferably varies around the outer surface 38 of the interior element 34 from a substantially zero amount, known as a compression area 40, to a relatively large amount, known as an expansion area 42.

The rotary pump 16 also preferably includes several vanes 44. The vanes 44 are preferably attached to the interior element 34 such that they slide outward to the exterior element 32 in the expansion area 42, and slide inward into the interior element 34 in the compression area 40. With this arrangement, the rotary pump 16 is commonly known as a vane pump 46. The rotary pump 16 may be designed with two compression areas 40 and two expansion areas 42 (as shown in FIG. 3B), with four compression areas 40 and four expansion areas 42 (as shown in FIG. 3C), or with any suitable number of compression and expansion areas.

In the preferred embodiment, the rotary pump 16 communicates with a hydraulic fluid (not shown). In this arrangement, any relative rotational movement of the carrier and the output shaft causes the vanes 44 to sweep through the expansion area 42 and into the compression area 40 with the hydraulic fluid. This sweeping movement pumps the hydraulic fluid into the pressure chamber, and increases the pressure in the pressure chamber. The rotary pump 16, including the interior element 34, the exterior element 32, and the several vanes 44, is preferably made with conventional materials and from conventional methods, but may alternatively be made with other suitable materials and from other suitable methods.

Figure 4:
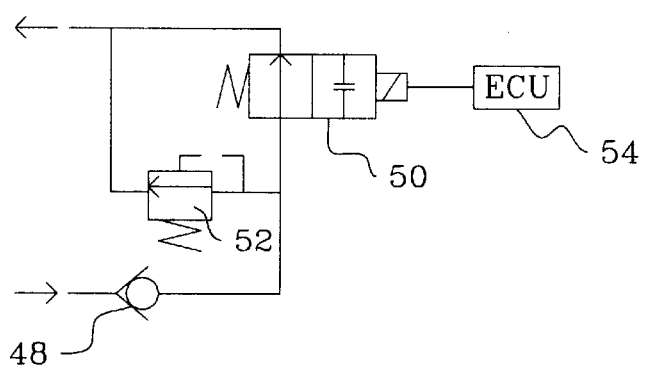
FIG. 4 is a schematic of the valves of the device in FIG. 1.

As shown in FIG. 4, the coupling device of the preferred embodiment also includes a check valve 48, a control valve 50, and a relief valve 52, each preferably coupled to the pressure chamber. The check valve 48 preferably functions to allow one-way passage of the hydraulic fluid. The control valve 50 preferably functions to control the pressure in the pressure chamber, while the relief valve 52 preferably functions to limit the pressure in the pressure chamber. The coupling device of the preferred embodiment may alternatively include other suitable valves or devices that function to suitably condition or alter the hydraulic fluid or pressure in the pressure chamber. The check valve 48, the control valve 50, and the relief valve 52 are all preferably made with conventional materials and from conventional methods, but may alternatively be made with other suitable materials and from other suitable methods.

The device of the preferred embodiment also includes an electric control unit 54 coupled to the control valve 50. The electric control unit 54 preferably functions to control the control valve 50 by pulse width modulation, but may function to control the control valve 50 by other suitable methods. By controlling the control valve 50, the electric control unit 54 controls the pressure in the pressure chamber 14. The electric control unit 54 is preferably made with conventional materials and from conventional methods, but may alternatively be made with other suitable materials and from other suitable methods.

As shown in FIG. 1, the coupling device 10 of the preferred embodiment also includes a housing 56. The housing 56 preferably defines an input opening 58 to receive the input shaft 18, an output opening 60 to receive the output shaft 20, and an interior space 62 to receive the carrier 12 and the rotary pump 16. The input opening 58 and the output opening 60 may include seals and ball bearings, or other suitable devices, to receive the input shaft 18 and the output shaft 20, respectfully. In addition to receiving the carrier 12 and the rotary pump 16, the interior space 62 also preferably receives the hydraulic fluid. The housing 56 is preferably made with conventional structural materials, such as steel, and from conventional methods, but may alternatively be made with other suitable materials and from other suitable methods.

The coupling device 10 of the preferred embodiment also includes a valve block 64, which functions to include the check valve, the control valve, and the relief valve. The valve block 64 is preferably coupled to an exterior surface 66 of the housing 56. In this manner, the valve block 64 may be disconnected and replaced without disassembling the housing 56. In other embodiments, one or more of the valves may be located within the bounds of the housing 56 or in other remote locations. The valve block 64 is preferably made with conventional structural materials, such as plastics or steel, and from conventional methods, but may alternatively be made with other suitable materials and from other suitable methods.

In the preferred embodiment, the housing 56 defines the pressure chamber 14, which functions to receive the hydraulic fluid from the rotary pump 16. In alternative embodiments, other suitable devices may define the pressure chamber 14.

The carrier 12 preferably includes a ring gear 68 and an internal extension 70. The ring gear 68 of the carrier 12 preferably functions to transfer rotational movement of the input shaft 18 into rotational movement of the carrier 12 about a perpendicular axis. The internal extension 70 of the carrier 12 preferably functions to bound the expansion area and a compression area of the rotary pump 16. The carrier 12, including the ring gear 68 and the internal extension 70, is preferably made with conventional structural materials, such as steel, and from conventional methods, but may alternatively be made with other suitable materials and from other suitable methods.

The coupling device 10 of the preferred embodiment also includes a second set of every element discussed above, except the carrier 12, the housing 56, and the electric control unit 54. The carrier 12 is preferably designed to couple the input shaft 18, the rotary pump 16, and a second rotary pump 116. The internal extension 70 of the carrier 12 preferably functions to bound the expansion area and the compression area of the rotary pump 16, and the expansion area and the compression area of the second rotary pump 116. The housing 56 is preferably designed with a second output opening 160 to receive the second output shaft 120. The second output opening 160, like the output opening 60, may include seals or ball bearings, or other suitable devices, to receive the second output shaft 120. The electric control unit 54 is preferably separately coupled to the control valve and a second control valve and, in this manner, the electric control unit 54 may selectively control the pressure in the pressure chamber 14 and selectively control the pressure in the second pressure chamber 114, thereby selectively distributing torque to the right and left rear wheels of the vehicle.

During the preferred operation of the coupling device 10 of the preferred embodiment, an engine, or other device, rotates the input shaft 18. The ring gear 68 of the carrier 12 transfers the rotational movement of the input shaft 18 into a rotational movement of the carrier 12. If the output shaft 20, which is connected to a wheel of the vehicle, rotates with the same rotational movement of the carrier 12, the rotary pump 16 does not pump the hydraulic fluid into the pressure chamber 14, and does not increase the pressure in the pressure chamber 14. If, however, the output shaft 20 starts to rotate with a different rotational movement than the carrier 12 (i.e., there is relative rotational movement of the carrier 12 and the output shaft 20), the rotary pump 16 pumps the hydraulic fluid into the pressure chamber 14, and increases the pressure in the pressure chamber 14. Further relative rotation movement of the carrier 12 and the output shaft 20 causes further pumping of the hydraulic fluid into the pressure chamber 14, and causes a further increase of the pressure in the pressure chamber 14. At some point, the pressure in the pressure chamber 14 will be sufficient to resist further pumping by the rotary pump 16. Quite simply, the pressure will prevent the vanes of the rotary pump 16 from sweeping into the compression area. At this point, the rotary pump 16 will resist relative rotational movement of the carrier 12 and the output shaft 20. The electric control unit 54 preferably controls the resistance of the rotary pump 16 by opening the control valve, thereby releasing some of the hydraulic fluid into the interior space 62 of the housing 56, and reducing the pressure in the pressure chamber 14.

As any person skilled in the arts of coupling devices will recognize from the previous description and from the figures in claims, modifications and changes can be made to the preferred embodiment of the invention without departing from the scope of the invention defined in the following claims.

I claim:

1. A device for coupling an input shaft and an output shaft, comprising:
   a carrier coupled to the input shaft;
   a pressure chamber;
   a rotary pump coupled to said carrier and the output shaft and adapted to increase pressure in said pressure chamber upon relative rotational movement of said carrier and the output shaft and to resist relative rotational movement of said carrier and the output shaft upon the presence of sufficient pressure in said pressure chamber;
   a control valve coupled to said pressure chamber and adapted to selectively maintain sufficient pressure in said pressure chamber, thereby urging said rotary pump to resist relative rotational movement of said carrier and the output shaft, and to selectively relieve pressure from said pressure chamber, thereby allowing relative rotational movement of said carrier and the output shaft; and
   an electric control unit coupled to said control valve and adapted to control said control valve.

2. The device of claim 1 further comprising a relief valve coupled to said pressure chamber and adapted to limit the pressure in said pressure chamber.

3. The device of claim 1 wherein said electric control unit is further adapted to control said control valve by pulse width modulation.

4. The device of claim 1 further comprising a housing defining an input opening adapted to receive the input shaft, defining an output opening adapted to receive the output shaft, and defining an interior space adapted to receive said carrier and said rotary pump.

5. The device of claim 4 wherein said housing defines said pressure chamber.

6. The device of claim 5 further comprising a relief valve coupled to said pressure chamber and adapted to limit the pressure in said pressure chamber.

7. The device of claim 6 further comprising a valve block coupled to an exterior surface of said housing and adapted to receive said control valve and said relief valve.

8. The device of claim 1 further comprising a second pressure chamber, and a second rotary pump coupled to said carrier and a second output shaft and adapted to increase pressure in said second pressure chamber upon relative rotational movement of said carrier and the second output shaft and to resist relative rotational movement of said carrier and the second output shaft upon the presence of sufficient pressure in said pressure chamber.

9. The device of claim 8 further comprising a housing defining an input opening adapted to receive the input shaft, defining an output opening adapted to receive the output shaft, defining a second output opening adapted to receive the second output shaft, and defining an interior space adapted to receive said carrier, said rotary pump, and said second rotary pump.

10. The device of claim 1 wherein said rotary pump includes a vane device.

11. The device of claim 10 wherein said rotary pump includes two expansion areas.

12. The device of claim 11 wherein said rotary pump includes four expansion areas.

13. A method for coupling an in put shaft and an output shaft, comprising:

providing a carrier and coupling the carrier to the input shaft;

providing a pressure chamber;

providing a rotary pump, coupling the rotary pump to the carrier and the output shaft, and adapting the rotary pump to increase pressure in the pressure chamber upon relative rotational movement of the carrier and the output shaft and to resist relative rotational movement of the carrier and the output shaft upon the presence of sufficient pressure in the pressure chamber;

providing a control valve, coupling the control valve to the pressure chamber, and adapting a control valve to selectively maintain sufficient pressure in said pressure chamber, thereby urging said rotary pump to resist relative rotational movement of said carrier and the output shaft, and to selectively relieve pressure from said pressure chamber, thereby allowing relative rotational movement of said carrier and the output shaft; and providing an electric control unit, coupling the electric control unit to the control valve, and adapting the electric control unit to control the control valve.

14. The method of claim 13 further comprising providing a relief valve, coupling the relief valve to the pressure chamber and adapting the relief valve to limit the pressure in the pressure chamber.

15. The method of claim 13 further comprising adapting the electric control unit to control the control valve by a pulse with modulation.

* * * * *